United States Patent
Coeuret et al.

(10) Patent No.: US 12,508,552 B2
(45) Date of Patent: Dec. 30, 2025

(54) FILTER COMPRISING A SILICONE CARBIDE SEPARATOR LAYER

(71) Applicant: SAINT-GOBAIN CENTRE DE RECHERCHES ET D'ETUDES EUROPEEN, Courbevoie (FR)

(72) Inventors: Xavier Coeuret, Bedarrides (FR); Adrien Vincent, Orgon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 866 days.

(21) Appl. No.: 17/627,441

(22) PCT Filed: Jul. 10, 2020

(86) PCT No.: PCT/EP2020/069675
§ 371 (c)(1),
(2) Date: Jan. 14, 2022

(87) PCT Pub. No.: WO2021/009084
PCT Pub. Date: Jan. 21, 2021

(65) Prior Publication Data
US 2022/0274070 A1    Sep. 1, 2022

(30) Foreign Application Priority Data

Jul. 18, 2019 (FR) ...................................... 1908171

(51) Int. Cl.
*B01D 69/02* (2006.01)
*B01D 67/00* (2006.01)
(Continued)

(52) U.S. Cl.
CPC ........ *B01D 67/00411* (2022.08); *B01D 69/02* (2013.01); *B01D 69/10* (2013.01);
(Continued)

(58) Field of Classification Search
CPC ........... B01D 2325/02; B01D 2325/04; B01D 61/147; B01D 63/066; B01D 67/00411;
(Continued)

(56) References Cited

U.S. PATENT DOCUMENTS

| | | | |
|---|---|---|---|
| 7,699,903 | B2 | 4/2010 | Stobbe et al. |
| 2016/0121272 | A1 | 5/2016 | Drury et al. |

(Continued)

FOREIGN PATENT DOCUMENTS

| | | |
|---|---|---|
| DE | 20 2010 015 318 U1 | 1/2011 |
| EP | 2 543 420 A1 | 1/2013 |

(Continued)

OTHER PUBLICATIONS

International Search Report as issued in International Patent Application No. PCT/EP2020/069675, dated Sep. 9, 2020.

(Continued)

*Primary Examiner* — Dirk R Bass
(74) *Attorney, Agent, or Firm* — Pillsbury Winthrop Shaw Pittman LLP

(57) ABSTRACT

A filter for the filtration of a fluid, such as a liquid, includes or is constituted by a support element made from a porous ceramic material, at least a portion of the surface of the support element being covered with a porous membrane separating layer, the membrane separating layer being constituted essentially of silicon carbide (SiC), its porosity being between 10% and 70% by volume, the median diameter of its pores being between 50 nanometers and 500 nanometers, its mean thickness being between 1 micrometer and 30 micrometers, and its tortuosity being less than 1.7.

19 Claims, 1 Drawing Sheet

(51) Int. Cl.
*B01D 69/10* (2006.01)
*C02F 1/44* (2023.01)
*C04B 35/565* (2006.01)
*C04B 38/00* (2006.01)

(52) U.S. Cl.
CPC .............. *C02F 1/44* (2013.01); *C04B 35/565* (2013.01); *C04B 38/0041* (2013.01); *C04B 38/0054* (2013.01); *C04B 38/0074* (2013.01); *B01D 2325/02* (2013.01); *B01D 2325/04* (2013.01); *C04B 2235/3826* (2013.01); *C04B 2235/3869* (2013.01); *C04B 2235/3873* (2013.01); *C04B 2235/3895* (2013.01); *C04B 2235/5436* (2013.01); *C04B 2235/5445* (2013.01); *C04B 2235/6027* (2013.01)

(58) Field of Classification Search
CPC .... B01D 69/02; B01D 69/10; B01D 71/0215; C02F 1/44; C04B 2111/00793; C04B 2235/3826; C04B 2235/3869; C04B 2235/3873; C04B 2235/3895; C04B 2235/5436; C04B 2235/5445; C04B 2235/5454; C04B 2235/6027; C04B 2235/606; C04B 2235/785; C04B 35/565; C04B 38/0041; C04B 38/0054; C04B 38/0058; C04B 38/0061; C04B 38/0064; C04B 38/0074; C04B 41/52
See application file for complete search history.

(56) References Cited

U.S. PATENT DOCUMENTS

2017/0348641 A1* 12/2017 Rodrigues ............ C04B 35/597
2018/0169588 A1   6/2018 Song et al.

FOREIGN PATENT DOCUMENTS

| EP | 2 559 470 A1 | 2/2013 |
| EP | 2 910 299 A1 | 8/2015 |
| EP | 3 009 182 A1 | 4/2016 |
| FR | 2 549 736 A1 | 2/1985 |
| FR | 2 587 026 A1 | 3/1987 |
| FR | 3 052 682 A1 | 12/2017 |
| WO | WO 2005/005016 A1 | 1/2005 |
| WO | WO 2009/039861 A1 | 4/2009 |
| WO | WO 2016/097661 A1 | 6/2016 |
| WO | WO-2017220907 A1 * 12/2017 ........... B01D 63/066 |

OTHER PUBLICATIONS

"Ceramics Flat Sheet Membrane: The high flux Flat Sheet Membrane (FSM)," Retrieved from the Internet, < https://liqtech.com/ceramics/silicon-carbide-ceramic-membrane/flat-sheet-membrane-series/>, Retrieved on Dec. 17, 2021.

Tjaden, B., et al., "Tortuosity in electrochemical devices: a review of calculation approaches," International Materials Reviews, vol. 63, No. 2, pp. 47-67, (2018).

* cited by examiner

[Figure 1]
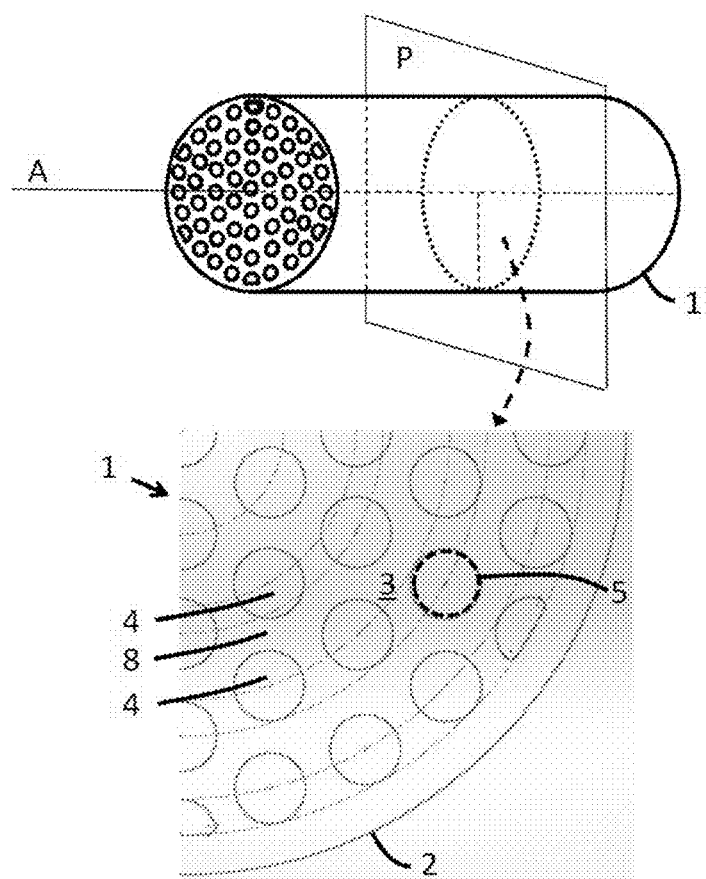
[Figure 2]
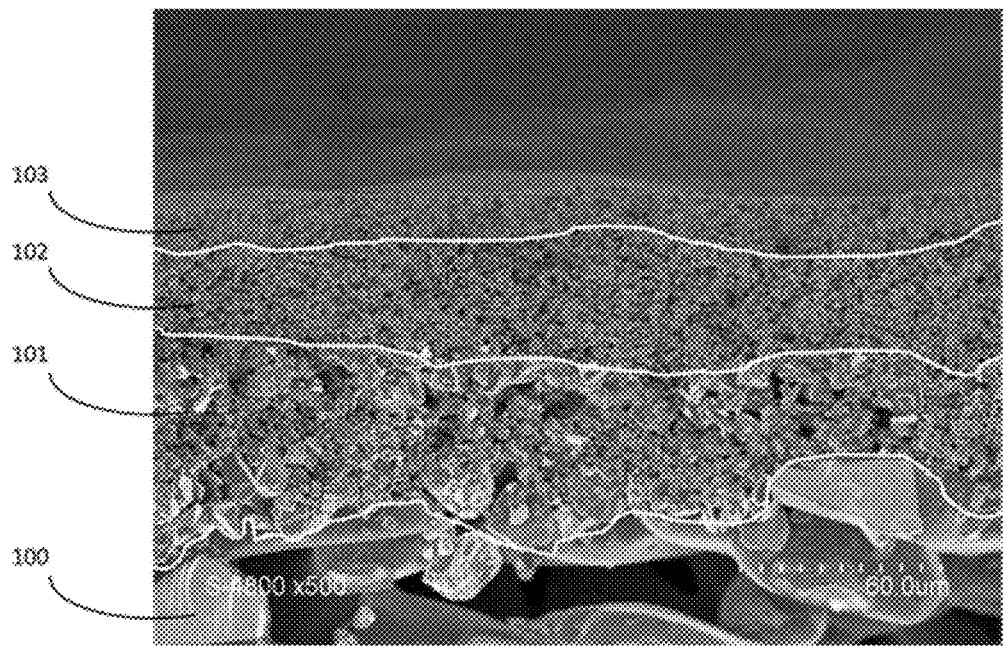

FILTER COMPRISING A SILICONE CARBIDE SEPARATOR LAYER

CROSS-REFERENCE TO RELATED APPLICATIONS

This application is the U.S. National Stage of PCT/EP2020/069675, filed Jul. 10, 2020, which in turn claims priority to French patent application number 1908171 filed Jul. 18, 2019. The content of these applications are incorporated herein by reference in their entireties.

The invention relates to the field of filtering structures made of an inorganic material which are intended for the filtration of liquids, in particular structures coated with a membrane in order to separate particles or molecules from a liquid, more particularly water.

Filters using ceramic or non-ceramic membranes for carrying out the filtration of varied fluids, in particular polluted water, have been known for a long time. These filters can operate according to the principle of dead-end filtration, this technique involving the passage of the fluid to be treated through a filter medium, perpendicular to its surface. This technique is limited by the accumulation of particles and the formation of a cake at the surface of the filter medium. This technique is thus more particularly suitable for the filtration of liquids with low loads of pollutants (that is to say, the liquid or solid particles in suspension).

According to another technique to which the present invention also relates, use is made of crossflow filtration which, on the contrary, makes it possible to limit the accumulation of particles, by virtue of the longitudinal circulation of the fluid at the surface of the membrane. The particles remain in the circulation stream while the liquid can pass through the membrane under the effect of the pressure. This technique provides stability of the performance qualities and of the level of filtration.

The strengths of crossflow filtration are thus its ease of use, its reliability by virtue of the use of organic and/or inorganic membranes, the porosity of which is suitable for carrying out said filtration, and its continuous operation. Crossflow filtration uses little or no adjuvant and provides two separate fluids which can both be upgradable: the concentrate (also called retentate) and the filtrate (also called permeate); it is considered to be a clean process which is environmentally friendly. Crossflow filtration techniques are used in particular for microfiltration or ultrafiltration. The crossflow configuration most often requires the use of at least two pumps, one for pressurization (or booster) and the other for recirculation. The recirculation pump often exhibits the disadvantage of a sizeable energy consumption. The employment of filtering devices guaranteeing high flow rates of the filtrate would make it possible to limit the energy consumption.

The present invention is thus suitable both for crossflow filters and for filters having dead-end filtration.

Numerous filter structures operating according to the principles of crossflow filtration or of dead-end filtration are thus known from the current art. They comprise or are constituted, for example, from tubular or parallelepipedal supports made of a porous inorganic material formed of walls delimiting longitudinal channels parallel to the axis of said supports.

In the case of crossflow filters, the filtrate passes through the walls and is then discharged at the level of the peripheral exterior surface of the porous support. These filters are more particularly suitable for filtering liquids highly laden with particles.

In the case of dead-end filters, the longitudinal channels are normally plugged at one end, for example alternately, so as to form inlet channels and outlet channels separated by the walls of the channels, the inlet and/or outlet channels being coated with the filter membrane through which all the liquid passes, the particles being retained by the membrane.

The surface of said channels is most often usually covered with a membrane, preferably made of a porous inorganic material, called membrane, membrane layer or membrane separating layer in the present description, the nature and the morphology of which are suitable for stopping the molecules or the particles, the size of which is close to or greater than the median diameter of the pores of said membrane, when the filtrate spreads through the porosity of the porous support under the pressure of the fluid passing through the filter. The membrane is conventionally deposited on the internal surface of the channels by a process of coating with a slip of the porous inorganic material, followed by a consolidation heat treatment, in particular a drying, and most often by a sintering of the ceramic membranes.

According to another technique, nonmonolithic filtering devices are known which consist of a succession of porous plates within a chamber, in which the liquid to be filtered is most often stirred so as to promote turbulent conditions. These devices promote the shear forces within the liquid in contact with the porous plates and are more efficient for the decontamination of heavily laden or very viscous liquids. Different forms of plates have been proposed, for example ceramic plates which are porous, solid or comprise a cavity or internal channels, making it possible for the filtrate to be discharged, such as, for example, according to FIG. 7 of WO2009/039861A1 or even as is proposed by the publication EP 2 543 420 A1. Such plates can exhibit a membrane deposited on the largest faces of the filter plate, as is described, for example, by DE202010015318U1. Some plates have been described with an internal cavity comprising a drainage material, as is described, for example, by EP 2 910 299 A1.

Numerous publications indicate different membrane filter configurations which are targeted at obtaining a filter exhibiting the optimum properties for the application and in particular:
 a low pressure loss,
 the highest possible exiting permeate flow,
 a high mechanical strength and in particular a high abrasion resistance as a result of the passage of the liquid to be filtered laden with particles at the surface of the membrane,
 a high selectivity with respect to the polluting entities to be filtered,
 ideally a high chemical resistance, in particular to acidity.

The studies previously carried out by the applicant company have shown, according to another complementary approach, that, within such filtering structures, it was useful to act on the chemical composition of the separating membrane, in order to further improve the filtration performance qualities of the structure, indeed even the lifetime of the filter. These studies are described in the patent application published under WO2016097661A1.

Despite the notable improvement in terms of abrasion resistance, the resistance to backwashing, a stage necessary for the regeneration of the membrane, still exhibits great room for improvement. During this stage, pressurized water is injected countercurrentwise in order to unclog the pollutants accumulated in the porosity of the filter. It was found by the applicant company that each backwash placed a strong mechanical stress on the membrane. In the end, the applicant company found an increase in the permeability of the membrane separating layer as the backwashing operations proceeded, an index of a gradual detachment thereof and thus of a loss in its effectiveness.

Other studies carried out by the applicant company have shown that it is still possible to improve the performance of a membrane constituted essentially of silicon carbide, this time by modifying the intrinsic structural characteristics of the membrane. Numerous documents of the art describe different possible compositions for the ceramic membrane made of porous inorganic material, without however establishing a causal relationship between the composition of the material constituting the membrane and the performance qualities of the filter.

According to one implementation, the application published under WO2005005016A1 or the corresponding U.S. Pat. No. 7,699,903 B2 describe a membrane separating layer made of silicon carbide obtained from a mixture of two powders of SiC particles of a crystallographic form sintered together at a temperature of between 1750 and 1950° C. The application FR 2 549 736 proposes to increase the flow of filtered liquid by specifying the size of the particles forming the filtering layer with respect to those forming the support. The layers disclosed exhibit, however, a flow considered to be low from the viewpoint of the present invention.

Other publications, for example the patent application EP 3 009 182 A1, propose membranes of silicon and of silicon carbide obtained from slips comprising three different powders with a median size respectively within the ranges 2 to 4 micrometers, 0.5 to 0.9 micrometers and 0.2 to 0.4 micrometers, before firing at a temperature of between 1500 and 1900° C., preferably one powder among these being a silicon powder. The abrasion resistance of such a membrane appeared to be too low to make it possible to obtain filters having a prolonged lifetime.

The object of the present invention is to provide a filter incorporating a membrane in the form of a separator which is mechanically resistant whatever its conditions of use and in particular during successive backwashings necessary for its correct operation, and the longevity of which is thus thereby improved, for filtration performance qualities which are identical or significantly improved with respect to previous implementations.

In particular, it has been demonstrated by the studies of the applicant company, described below, that it is possible to obtain an optimum in terms of resistance to backwashing, of filtration flow, while maintaining a very good selectivity, by an appropriate selection of the constituent material of said membranes, it being possible for said material to be obtained by the process according to the invention.

Very particularly, there has been demonstrated by the studies of the applicant company, described below, an advantage not yet described in the art of membrane filters made of recrystallized silicon carbide (SiC), in particular in the a form, intended for the filtration of liquids.

It has been possible, according to the present invention, to obtain membranes which are very resistant to abrasion and above all very resistant to strong backwashing, without increasing the size of the pores and thus without reducing the selectivity of the filter, as is usually observed on nonoxide membranes, in particular membranes made of silicon carbide (SiC) obtained by sintering at high temperature.

In the present description, the terms separating membranes, separating layer or membrane separating layer are used without distinction to denote such layers making possible filtration.

The invention thus relates according to a first aspect to a filtering structure or a filter configured for the filtration of a fluid, such as a liquid, comprising or constituted by a support element made from a porous ceramic material and provided with a membrane separating layer making possible said filtration.

More specifically, the present invention relates to a filter for the filtration of a fluid, such as a liquid, comprising or constituted by a support element made from a porous ceramic material, at least a portion of the surface of said support element being covered with a porous membrane separating layer, said membrane separating layer being constituted essentially of silicon carbide (SiC), its porosity being between 10% and 70% by volume, the median diameter of its pores being between 50 nanometers and 500 nanometers, its mean thickness being between 1 micrometer and 30 micrometers, and its tortuosity being less than 1.7.

A filter, the membrane of which exhibits the characteristics described above, very particularly reveals a noteworthy resistance to backwashing while maintaining a high filtrate flow without increasing the size of the pores and thus without reducing the selectivity of the filter.

Said support element can be provided in any known form, in particular in the form of a plate, of a disk, of a tube or of a parallelepiped. At least a portion of the surface of the support is covered with a layer of a material, the structural characteristics of which make it possible to filter the impurities present in a fluid, in particular a liquid, passing through said layer and then said support.

For example, said support can be delimited by an external surface and comprise, in its internal portion, a set of adjacent channels delimiting an internal surface, said channels preferably having axes parallel to one another and separated from one another by walls of a porous ceramic material, at least a part of said external surface and/or of the internal surface of said channels being covered with a porous membrane separating layer. During the operation of the filter, this layer, as indicated above, comes into contact with said fluid to be filtered, the permeate passes through said porous ceramic material and is then discharged by a discharge means. In the specific case of a tubular or parallelepipedal filter, the permeate can be discharged by the external surface according to a crossflow filtration mode or by a part of the channels not covered with the membrane separating layer according to a dead-end filtration mode.

The support according to the invention can also be provided in other forms, such as plates, as already described above, optionally exhibiting, in its thickness, channels for discharge of the filtrate.

According to optional and advantageous additional characteristics of the membrane separating layer:

The SiC represents more than 95%, preferably more than 97%, indeed even more than 99%, of the weight of the material constituting the membrane separating layer.

The SiC constituting the grains is essentially in a crystallographic form, as can be determined by X-ray diffraction analysis.

The porosity of the membrane separating layer is preferably, by volume, between 30% and 60%, more preferably between 35% and 50%, indeed even between 35% and 45%.

The median pore diameter is between 60 nanometers and 450 nanometers, preferably between 75 and 400 nanometers, in particular between 100 and 300 nanometers.

The mean thickness of the separating layer is between 3 micrometers and 20 micrometers, more preferably between 4 and 15 micrometers, indeed even between 5 and 10 micrometers.

The tortuosity of the layer constituting the porous membrane separating layer is less than 1.6, preferably less than 1.5, indeed even less than or equal to 1.4, or even less than 1.3.

The tortuosity of the layer constituting the porous membrane separating layer is greater than 1, preferably is greater than or equal to 1.1.

The median size of the SiC grains in said membrane separating layer is preferably greater than 60 nanometers, preferably greater than 80 nanometers, more preferably greater than 100 nanometers, indeed even greater than 150 nanometers.

The median size of the SiC grains in said membrane separating layer is less than 400 nanometers, preferably less than 300 nanometers, more preferably less than 250 nanometers, indeed even less than 200 nanometers. Such sizes can be measured by analysis of photographs obtained by scanning electron microscopy (SEM).

In the material constituting the membrane separating layer according to the invention, oxygen in particular, indeed even also nitrogen, can be present in the grains by insertion into the crystal lattice of the SiC and/or partially at the surface of the grains and at the grain boundaries. According to a possible, indeed even preferred, mode, the nitrogen and/or the oxygen are only present in the separating layer in the form of unavoidable impurities.

As regards the porous support, the following information is given relating to preferred but nonlimiting embodiments of the present invention:

Said support element is provided in the form of a plate, of a disk, of a tube or of a parallelepiped.

The porosity of the material constituting the porous support element is between 20% and 70%, preferably between 30% and 60%.

The median pore diameter of the material constituting the porous support element is between 5 and 50 micrometers, more preferably between 10 and 40 micrometers.

The tortuosity of the support element is greater than 1, indeed even greater than 1.1, indeed even greater than 1.2, indeed even greater than 1.3, indeed even greater than 1.4 and/or less than 2, indeed even less than 1.9, indeed even less than 1.8, indeed even less than 1.7.

The porous support element comprises and preferably is constituted of a ceramic material, preferably a nonoxide ceramic material, preferably chosen from silicon carbide SiC, in particular solid-phase or liquid-phase sintered SiC, recrystallized SiC, silicon nitride, in particular $Si_3N_4$, silicon oxynitride, in particular $Si_2ON_2$, silicon aluminum oxynitride, or a combination thereof. Preferably, the support is constituted essentially of silicon carbide, more preferably still is constituted essentially of recrystallized SiC.

The base of the tubular or parallelepiped form is polygonal, preferably square or hexagonal, or circular. The tubular or parallelepiped form exhibits a longitudinal central axis of symmetry (A).

In particular in the case of a filter with dead-end filtration, the channels are plugged at one end, preferably alternately, in order to define inlet channels and outlet channels so as to force the incoming liquid through the inlet channels at the surface of which is deposited the membrane through which the liquid passes before being discharged through the outlet channels.

If the filter is crossflow, the end of the tubular support can be in contact with a plate impermeable to the liquid to be filtered and perforated at the location of the channels facing it, so as to form a filtering support placed in a pipe or a filtration system. Another possibility can consist in introducing the crossflow filter into the pipe an impermeable peripheral seal at each end and around the filter so as to provide the permeate flow independently of the concentrate flow.

The elements are of hexagonal section, the distance between two opposite sides of the hexagonal section being between 20 and 80 mm.

The ducts of the filtering elements are open over both their ends.

The ducts of the filtering elements are alternately plugged on the face for introduction of the liquid to be filtered and on the opposite face.

The ducts of the filtering elements are open on the face for introduction of the liquid and closed on the recovery face.

A majority of the ducts, in particular more than 50%, indeed even more than 80%, are of square, round or oblong section, preferably round section, and more preferably have a hydraulic diameter of between 0.5 mm and 10 mm, preferably between 1 mm and 5 mm. The hydraulic diameter Dh of a channel is calculated, in any cross section plane P of the tubular structure, from the surface area of the section of the channel S of said channel and from its perimeter P, according to said section plane and by application of the following conventional expression:

$$Dh=4\times S/P$$

As indicated above, the filter according to the invention preferably comprises, besides the membrane separating layer, one or more intermediate layers positioned between the material constituting the support element and the material constituting the membrane separating layer. The role of this (these) "intermediate" layer(s) consists in facilitating the attachment of the separating layer and/or in preventing the particles of the separating membrane from passing through the support, in particular during a deposition by coating.

The filter can additionally comprise one or more intermediate layers positioned between the material constituting the support element and the material constituting the membrane separating layer.

Preferably, the intermediate layer or layers are essentially constituted of SiC.

Preferably, at least one intermediate layer exhibit(s) a median pore diameter at least two times greater, indeed even at least three times greater, than that of the membrane separating layer and preferably a thickness of between 40 and 100 micrometers.

Advantageously, each intermediate layer exhibits a mean thickness of between 5 and 100 micrometers, preferably of between 15 and 70 micrometers, preferably of between 20 and 80 micrometers, indeed even between 30 and 60 micrometers.

In particular, according to one possible mode, the filter comprises a first intermediate layer with a median pore diameter of 0.5 to 3 micrometers, and/or with a porosity of 30% to 50% by volume, and/or with a median grain size of from 5 to 15 micrometers, according to a mean thickness of 5 to 90 micrometers.

According to another possible mode, the filter comprises a first intermediate layer, deposited on the support, the median pore diameter of which is from 0.5 to 3 micrometers, and/or the porosity of which is from 30% to 60% by volume, and/or the median grain size of which is of from 5 to 15 micrometers, according to a mean thickness of 5 to 50 micrometers. A second intermediate layer, layer with a median pore diameter of 0.4 to 0.8 micrometers, and/or with a porosity of 30% to 60% by volume, and/or with a median grain size of from 0.5 to 0.9 micrometers, according to a mean thickness of 5 to 90 micrometers, is deposited on said first intermediate layer.

In the present description, unless otherwise specified, all the percentages are by weight.

Without there being any need to give them again here, it is very obvious that the invention also relates to the membrane separating layers meeting all the preferred characteristics described above, in connection with the filtering structure in which said layer is incorporated.

A filter according to the invention and as described above has a use in particular in the filtration of liquids, in particular of an aqueous liquid, for example a fruit juice, or of an alcoholic liquid, in particular wine, beer or a spirit.

Finally, the invention relates to a process for the manufacture of a filter as described above, in particular a cross-flow or dead-end filter, comprising the following stages:

preparation of a slip starting from a powder of silicon carbide particles with a mean size of between 0.05 and 0.4 micrometers, preferably between 0.1 and 0.3 micrometers, application of said slip to at least a portion of the surface of the support element, under conditions making possible the formation of a thin layer of the slip, preferably of between 1 and 50 micrometers, drying then firing under a nonoxidizing, preferably neutral, atmosphere, in particular under argon, at a temperature of between 1400° C. and 1600° C., and in this temperature range for a time sufficient to obtain the membrane separating layer, for example between 10 and 120 minutes, preferably 15 and 45 minutes, said layer being constituted essentially of silicon carbide.

Such a manufacturing process can additionally comprise, before the stage of deposition of said slip, a stage of deposition of at least one intermediate layer starting from a slip comprising a powder of silicon carbide particles, at least a fraction of the grains of which exhibits a median diameter of less than 1 micrometer and greater than 0.1 micrometer.

The following information is additionally given:

The open porosity and the median pore diameter of the porous support which are described in the present description are determined in a known way by mercury porosimetry according to the standard ISO 15901-1.2005, Part 1.

The porosity and the median pore diameter of the membrane separating layer (and of the intermediate layer(s)) are advantageously determined according to the invention using a scanning electron microscope. For example, sections of a wall of the support are produced in cross section, as illustrated by the appended FIG. 2, so as to display the entire thickness of the coating over a cumulative length of at least 1.5 cm. The images are acquired on a sample of at least 10 grains. The area and the equivalent diameter of each of the pores are obtained from the photographs by conventional image analysis techniques, preferably after binarization or segmentation of the image targeted at increasing the contrast thereof. A distribution of equivalent diameters is thus deduced, from which the median pore diameter is extracted.

Likewise, a median size of the particles constituting the membrane layer can be determined by this method.

An example of determination of the median pore diameter or of the median size of the particles constituting the membrane separating layer, by way of illustration, comprises the sequence of the following stages, which is conventional in the field:

A series of SEM photographs is taken of the support with its membrane separating layer observed along a cross section (that is to say, throughout the thickness of a wall). For greater sharpness, the photographs are taken on a polished section of the material. The image is acquired over a cumulative length of the membrane layer at least equal to 1.5 cm, in order to obtain values representative of the whole of the sample.

The photographs are preferably subjected to binarization techniques, well known in image processing techniques, in order to increase the contrast of the outline of the particles or of the pores.

For each particle or each pore constituting the membrane separating layer, a measurement of its area is carried out. An equivalent pore or grain diameter is determined, corresponding to the diameter of a perfect disk of the same area as that measured for said particle or for said pore (it being possible for this operation optionally to be carried out using dedicated software, in particular Visilog® sold by Noesis).

a distribution of size of particles or of grains or of diameter of pores is thus obtained according to a conventional distribution curve and a median size of the particles and/or a median diameter of pores constituting the membrane layer are thus determined, this median size or this median diameter corresponding respectively to the equivalent diameter dividing said distribution into a first population comprising only particles or pores with an equivalent diameter greater than or equal to this median size and a second population comprising only particles with an equivalent diameter lower than this median size or this median diameter.

The tortuosity is a well-known parameter in the field of porous structures, as described in the publication "Tortuosity in electrochemical devices: a review of calculation approaches", International Materials Reviews, 63, 2, pp. 47-67 (2018).

It can be measured by image analysis of a series of cross sections of the membrane according to different planes parallel to one another and perpendicular to the filtering surface of the membrane separating layer in order to give an account of the three-dimensional structure of the microstructure of said membrane throughout its thickness. A suitable technique is the use of a scanning electron microscope equipped with a focused ion probe or FIB (focused ion beam). Another possible technique is nanotomography. The images preferably have a minimum resolution of one million pixels in order to obtain an image quality suitable for a satisfactory binarization or segmentation in order to clearly distinguish the ceramic walls from the porosity of the membrane throughout its thickness. The use of software, such as iMorph©, makes it possible to obtain a three-dimensional geometric characterization of the membrane layer and to calculate the tortuosity. The tortuosity is defined as the ratio of the shortest path making it possible to cross the membrane separating layer in the direction of its thickness, within its porosity, to the distance or the line segment joining the point of departure and the point of arrival corresponding to this path. The tortuosity of the support can be measured according to the same procedure.

Within the meaning of the present description and unless otherwise mentioned, the median size of the particles or the median diameter of the pores measured by microscopy respectively denotes the diameter of the particles or of the pores below which 50% by number of the population is found. On the other hand, as regards the pore diameter measured on the substrate or the support by mercury porosimetry, the median diameter corresponds to a threshold of 50% of the population by volume.

The term "sintering", conventionally in the field of ceramics (that is to say, within the meaning indicated in the international standard ISO 836:2001, point 120), refers to a consolidation by heat treatment of a granular agglomerate. The heat treatment of the particles which are used as starting charge for obtaining the membrane layers according to the invention thus makes possible the joining and the growth of their contact interfaces by movement of the atoms inside and between said particles.

The sintering between the SiC grains according to the invention is normally carried out essentially in the solid/gas phase, the sintering temperature being close to, indeed even greater than, the vaporization temperature of the finest particles constituting the deposit of the membrane separating layer.

The median diameter $D_{50}$ of the powders of particles used to produce the support or the membrane separating layer is conventionally given by a particle size distribution characterization, for example by means of a laser particle size analyzer.

The SiC content can also be measured according to a protocol defined according to the standard ANSI B74.15-1992-(R2007), by the difference between total carbon and free carbon, this difference corresponding to the carbon fixed in the form of silicon carbide.

A nonlimiting example making possible the production of a filter according to the invention is given below, very obviously also not limiting the processes making it possible to obtain such a filter and the process according to the present invention.

According to a first stage, the filtering support is obtained by extrusion of a paste through a die configured according to the geometry of the structure to be produced according to the invention. The extrusion is followed by a drying and a firing in order to sinter the inorganic material constituting the support and to obtain the characteristics of porosity and of mechanical strength necessary for the application.

For example, when a SiC support is concerned, it can in particular be obtained according to the following manufacturing stages:
  kneading of a mixture comprising particles of silicon carbide with a purity of greater than 98% and exhibiting a particle size distribution such that 75% by weight of the particles exhibit a diameter of greater than 30 micrometers, the median diameter by weight of this particle size fraction (measured by laser particle size analyzer) being less than 300 micrometers. The mixture also comprises an organic binder of the type derived from cellulose. Water is added and kneading is carried out until a homogeneous paste is obtained, the plasticity of which makes possible the extrusion, the die being configured in order to obtain the monoliths according to the invention.
  drying of the raw monoliths by microwave for a time sufficient to bring the content of non-chemically-bonded water to less than 1% by weight.
  firing up to a temperature of at least 1300° C. in the case of filtering support based on liquid-phase sintered SiC, silicon nitride, silicon oxynitride, silicon aluminum oxynitride or even BN and of at least 1900° C. and less than 2400° C. in the case of a filtering support based on recrystallized or solid-phase sintered SiC. In the case of a filtering support made of nitride or oxynitride, the firing atmosphere is preferably nitrogen-based. In the case of a filtering support made of recrystallized SiC, the firing atmosphere is preferably neutral and more particularly of argon. The temperature is typically maintained for at least 1 hour and preferably for at least 3 hours in a cell furnace at ambient pressure. The material obtained exhibits an open porosity of 20% to 60% by volume and a median pore diameter of the order of 5 to 50 micrometers.

The filtering support is subsequently coated according to the invention with a membrane (or membrane separating layer). One or more layers can be deposited in order to form a membrane according to various techniques known to a person skilled in the art: techniques for deposition from suspensions or slips, chemical vapor deposition (CVD) techniques or thermal spraying techniques, by example plasma spraying.

Preferably, the membrane layers are deposited by coating from slips or suspensions. A first layer (referred to as intermediate layer) is preferentially deposited in contact with the porous material constituting the substrate, acting as tie layer.

A nonlimiting example of an inorganic formulation of the intermediate layer comprises 30% to 60%, preferably between 35% and 50%, by weight of SiC powder(s) with a median diameter of 2 to 20 microns, the remainder being demineralized or deionized water (except for the optional organic additives). According to one possible mode, a second intermediate layer is deposited on the first intermediate layer. The formulation of this second layer comprises, by weight, from 20% to 65%, preferably between 35% and 60%, of an SiC powder with a median diameter 0.5 and 0.9 micrometer, the remainder to 100% being provided by the demineralized water (except for the organic additives or additions).

According to another nonlimiting example, the intermediate layer is unique and its formulation comprises, by weight, from 15% to 25% of an SiC powder with a median diameter of 7 to 15 micrometers, 5% to 15% of an SiC powder with a median diameter of 1.5 to 5 micrometers and 0.5% to 5% of an SiC powder with a median diameter of 0.1 to 1.0 micrometer, preferably of 0.13 to 0.3 micrometer, the balance to 100%, preferably between 60% and 80%, being provided by demineralized or deionized water (except for the organic additives or additions).

Although preferentially present, in certain filter configurations this second intermediate layer can be absent without departing from the scope of the invention.

Another layer of smaller median pore size is subsequently deposited on the last intermediate layer (or directly on the support), which constitutes the membrane or membrane separating layer proper. The porosity of this last layer is suitable for conferring, on the filtering element, its final filtration properties, in particular its selectivity, by an adjusted value of its median pore diameter. A nonlimiting example of an inorganic separating layer formulation comprises from 2% to 20%, preferably between 3% and 10%, by weight of SiC powder(s) with a median diameter of 0.05 to 0.5 micrometer, preferably of 0.1 to 0.3 micrometer, the remainder being demineralized water (except for the optional organic additives).

In order to control the rheology of the slips and to observe an appropriate viscosity (typically between 0.01 and 1.5 Pa·s, preferably from 0.1 to 0.8 Pa·s, under a shear gradient of 1 s$^{-1}$ measured at 22° C. according to the standard DINC33-53019), thickening agents (according to proportions typically between 0.01% and 2% of the weight of water). Binding agents (typically between 0.5% and 20% of the weight of SiC powder) and dispersing agents (between 0.01% and 1% of the weight of SiC powder) can also be added. The thickening agents are preferably cellulose derivatives, the binding agents are preferably PVAs or acrylic derivatives and the dispersing agents are preferably of the ammonium polymethacrylate type.

Organic additions, expressed by weight, of the slip, in particular Dolapix A88 as deflocculating agent, for example according to a proportion of 0.01% to 0.5%; Tylose, for example of MH4000P type as thickener according to a proportion of 0.01% to 1%; PVA or an acrylic base resin as tackifying agent in a proportion of 0.1% to 2%, expressed by weight on a dry basis; monoethylene glycol as plasticizer; and 95% by volume of ethanol as a surface tension reducer, are more particularly suitable.

These coating operations typically make it possible to obtain an intermediate layer with a thickness of approximately 30 to 80 micrometers after drying. During the second coating stage, a membrane separating layer with a thickness, for example, of approximately 3 to 20 micrometers, preferably between 5 and 15 micrometers, indeed even more preferably between 5 and 10 micrometers, is obtained after drying, this thickness range being, of course, in no way limiting.

The specific stages of a process according to the invention for the deposition of the membrane separating layer according to the invention on the support, optionally above the intermediate layer described above, are described below:

According to a first favored embodiment, a slip is prepared as indicated above from a powder or preferably several powders of silicon carbide particles with different particle size distributions and in the presence of the amount of water which preferably makes it possible to observe the rheology and viscosity conditions described above, as well as in the presence of the necessary organic agents, preferably so as to obtain a slip having a pH of less than or equal to 10.

The slip is subsequently applied to the support element, under conditions and by means suitable for making possible the formation of a thin layer on the internal part of the channels of said filter, as in particular described above.

After application of this layer, the support is first dried at ambient temperature, typically for at least 10 minutes, then heated at 60° C. for at least 12 hours. Finally, a porous membrane separating layer on the surface of the channels of the support is obtained by sintering in a furnace, in a nonoxidizing atmosphere, preferably under an atmosphere comprising very predominantly or exclusively argon (Ar), at atmospheric pressure (1 bar). The firing temperature is typically at least 1400° C., preferably at least 1500° C., and is preferentially less than 1600° C. for a sufficient time, in particular of at least one hour, in order to obtain the membrane as described above according to the invention.

The thickness of the membrane separating layer obtained is preferably between 5 and 15 micrometers. The electron microscopy and diffraction analyses supplemented by X-ray fluorescence show that the material thus obtained is constituted essentially of grains of α-SiC.

In a way essential for obtaining the desired properties according to the invention, the silicon carbide powders initially chosen in the process for the preparation of the membrane separating layer are selected according to the following criteria:

the initial SiC powder exhibits a content of metallic Si of less than 1.0% by weight, preferably of less than 0.5% by weight, indeed even of less than 0.2% by weight, the initial SiC powder exhibits a content of elemental oxygen of less than 2.0% by weight, preferably of less than 1.5%, indeed even of less than 1.0%, the initial SiC powder exhibits a content of SiC of greater than 97% by weight, the median diameter of the initial SiC powder is less than 400 nanometers, preferably less than 300 nanometers, more preferably less than 250 nanometers, indeed even less than 200 nanometers.

If the filter is configured for a crosswise filtration application, it can be fixed to a perforated plate at the place of the channel openings, in a sealed manner, in order to be installed in a pipe or a filtration system. The heat treatment employed to fix the perforated plate to the filter support must be carried out at a temperature below the decomposition temperature of the composite membrane.

If the filter exhibits channels which are alternately plugged in order to obtain a membrane filter operating according to the principles of dead-end filtration and if the plugging is carried out subsequent to the deposition of the membrane at least for one face of the filter, either on the side of the inlet channels or on the outlet side, the plugging can be carried out with a SiC slip, the plugs being sintered at a temperature below the decomposition temperature of the composite membrane, preferentially at the same time as the membrane.

The figures associated with the examples which follow are provided in order to illustrate the invention and its advantages, without, of course, the embodiments thus described being able to be regarded as limiting of the present invention.

In the appended figures:

FIG. 1 illustrates a conventional configuration of a tubular filter according to the current art, along a cross section plane P.

FIG. 2 is a microscopy photograph of a filter showing the membrane separation layer within the meaning of the present invention.

FIG. 1 illustrates a crosswise filter 1 according to the current art and in accordance with the present invention, as used for the filtration of a fluid, such as a liquid. FIG. 1 represents a diagrammatic view of the cross section plane P. The filter comprises or most often is constituted by a support element 1 made from a porous, preferably nonoxide, inorganic material. The element conventionally exhibits a tubular form with a longitudinal central axis A, delimited by an external surface 2. It comprises, in its internal portion 3, a set of adjacent channels 4, with axes parallel to one another and separated from one another by walls 8. The walls are formed from a porous inorganic material allowing the filtrate to pass from the internal part 3 to the external surface 2. The channels 4 are covered on their internal surface with a membrane separating layer 5 deposited on a tie intermediate, as illustrated by the electron microscopy photograph shown in FIG. 2. This membrane separating layer 5 (or membrane) comes into contact with said fluid circulating in said channels and makes possible the filtration thereof.

In FIG. 2, an electron microscopy photograph taken on a channel 4 of FIG. 1 has been shown. The porous support 100 of high porosity, a first intermediate layer 101, a second intermediate layer 102 making possible the attachment of the membrane separating layer 103 of finer porosity, are observed in this figure.

According to another configuration, not represented, of another filter according to the invention, the latter is configured in order for the fluid to be treated to initially pass through the external wall, the permeate being collected by a reception means. According to such a configuration, the membrane filtering layer is advantageously deposited on the external surface of the filter and covers at least a part of it.

Such a configuration is often referred to as FSM (Flat Sheet Membrane). Reference can be made to the publication available on the website: http://www.liqtech.com/img/user/file/FSM_Sheet_F_4_260214V2.pdf.

The examples which follow are provided solely by way of illustration. They are not limiting and make it possible to better understand the technical advantages associated with the implementation of the present invention.

The supports according to all the examples are identical and are obtained according to the same experimental protocol which follows.
The following are mixed in a kneader:
3000 g of a mixture of the two powders of silicon carbide particles with a purity of greater than 98% in the following proportions: 75% by weight of a first powder of particles exhibiting a median diameter of the order of 60 micrometers and 25% by weight of a second powder of particles exhibiting a median diameter of the order of 2 micrometers. (Within the meaning of the present description, the median diameter $d_{50}$ denotes the diameter of the particles below which 50% by weight of the population of said particles is found.)
300 g of an organic binder of the cellulose derivative type. Water, approximately 20% by weight with respect to the total weight of SiC and of organic additive, is added and kneading is carried out until a homogeneous paste is obtained, the plasticity of which makes possible the extrusion of a structure of tubular shape, the die being configured in order to obtain monolithic blocks, the channels and the external walls of which exhibit a structure according to the desired configuration and as represented in the appended FIG. 1.

More specifically, the fired monoliths exhibit round channels with a hydraulic diameter of 2 mm, the peripheral half-moon channels represented in the figures exhibiting a hydraulic diameter of 1.25 mm. The mean thickness of the external wall is 1.1 mm and the OFA (Open Front Area) of the inlet face of the filter is 37%. The OFA is obtained by calculating the ratio, as percentage, of the area covered by the sum of the cross sections of the channels to the total area of the corresponding cross section of the porous support.
5 to 10 raw supports with a diameter of 25 mm and with a length of 30 cm are thus synthesized for each configuration.

The raw monoliths thus obtained are dried by microwave for a time sufficient to bring the content of non-chemically-bonded water to less than 1% by weight.

The monoliths are subsequently fired up to a temperature of at least 2100° C. which is maintained for 5 hours. The material obtained exhibits an open porosity of 43% and a mean pore distribution diameter of the order of 25 micrometers, as measured by mercury porosimetry.
The grains exhibit a median size of approximately 20 micrometers.

EXAMPLE 1 (COMPARATIVE ACCORDING TO WO2016097661A1)

According to this example, a membrane separating layer made of silicon carbide is subsequently deposited on the internal wall of the channels of a support structure as obtained above, according to the process described below: An intermediate layer for attachment of the separating layer is formed, as a first step, from a slip, the inorganic formulation of which comprises 30% by weight of a powder of SiC grains (Sika DPF-C), the median diameter $D_{50}$ of which is approximately 11 micrometers, 20% by weight of a powder of SiC grains (Sika FCP-07), the median diameter $D_{50}$ of which is approximately 2.5 micrometers, and 50% of deionized water.

A slip of the material constituting the membrane filtration layer is also prepared, the formulation of which comprises 40% by weight of SiC grains ($d_{50}$ around 0.6 micrometers) and 60% of deionized water.

The rheology of the slips was adjusted by addition of the organic additives to 0.5-0.7 Pa·s under a shear gradient of 1 s$^{-1}$, measured at 22° C. according to the standard DINC33-53019.

These two layers are deposited successively according to the same process described below: the slip is introduced into a tank with stirring (20 revolutions/min). After a phase of deaeration under a gentle vacuum (typically 25 millibar) while maintaining agitation, the tank is put under an excess pressure of approximately 0.7 bar in order to be able to coat the inside of the support from its bottom part up to its upper end. This operation only takes a few seconds for a support with a length of 30 cm. Immediately after coating with the slip on the internal wall of the channels of the support, the excess is discharged by gravity.

The supports are subsequently dried at ambient temperature for 10 minutes, then at 60° C. for 12 h. The supports, thus dried, are subsequently fired under nitrogen at a temperature of 1600° C. for 2 h at ambient pressure.

A cross section is produced on the filters thus obtained. The structure of the membrane is observed and studied with a scanning electron microscope according to the methods described below.

EXAMPLE 2 (COMPARATIVE)

According to this example, the procedure is identical to that of example 1 but the firing of the coated supports is carried out at 1600° C. under argon, the time interval being 30 minutes between 1400 and 1600° C.

EXAMPLE 3 (COMPARATIVE)

According to this example, the procedure is identical to that of example 1 but the firing of the coated supports is carried out at 1550° C. under argon, the time interval being 30 minutes between 1400 and 1550° C.

EXAMPLE 4 (ACCORDING TO THE INVENTION)

According to this example, the procedure is identical to that of the preceding example 3 but the coated supports are fired under argon at 1650° C. instead of 1550° C., the time interval being 30 minutes between 1400 and 1650° C. A third layer which becomes the separating layer is subsequently deposited. This layer is obtained by deposition of a slip, the formulation of which corresponds to 7% by weight of a powder of green SiC grains, the median diameter $D_{50}$ of which is approximately 0.18 micrometer, corresponding to a specific surface of 50 m$^2$/g, and the remainder being deionized. In particular for the slip of this separating layer, the pH is adjusted to between 9 and 10 by the addition of sodium hydroxide solution. In order to thicken the slip, to control the sedimentation and to obtain a film-forming effect for a good surface appearance after drying, 0.01 to 0.03 of Tylose MH4000P2 is added with respect to the amount of water. A mean thickness of 7 micrometers is deposited by monitoring the weight of the slip fixed to the substrate. The supports, thus coated, are fired again up to 1550° C. under argon at ambient pressure, the time interval being 30 minutes between 1400 and 1550° C.

EXAMPLE 5 (ACCORDING TO THE INVENTION)

According to this example, the procedure is identical to that of example 3 but:
the separating layer of grains, the median grain diameter $D_{50}$ of which is approximately 0.18 micrometer, is deposited directly on a single intermediate tie layer formed from a slip, the inorganic formulation of which comprises 18% by weight of a powder of SiC grains (Sika DPF-C), the median diameter $D_{50}$ of which is approximately 11 micrometers, 9% by weight of a powder of SiC grains (Sika 1500F), the median diameter $D_{50}$ of which is approximately 2 micrometers, 3% by weight of a powder of SiC grains, the median diameter $D_{50}$ of which is approximately 0.18 micrometer, the remainder being 70% of deionized water, and
the separating layer is obtained by deposition of a slip, the formulation of which exhibits 7% by weight of a powder of green SiC grains, the median diameter $D_{50}$ of which is approximately 0.18 micrometer, prepared as in example 4. A mean thickness of 7 micrometers is deposited by monitoring the weight of the slip fixed to the substrate.

The supports, thus coated, are fired again at ambient pressure at 1550° C. under argon, the time interval being 30 minutes between 1400 and 1550° C.

EXAMPLE 6 (COMPARATIVE)

Unlike the previous example, the intermediate layer is formed from a slip, the inorganic formulation of which comprises 30% by weight of a powder of SiC grains (Sika DPF-C), the median diameter $D_{50}$ of which is approximately 11 micrometers, 20% by weight of a powder of SiC grains (Sika FCP-07), the median diameter $D_{50}$ of which is approximately 2.5 micrometers, and 50% of distilled water. A separating layer identical to that of the preceding example is deposited on the intermediate layer by monitoring the weight of the slip fixed on the substrate.

EXAMPLE 7 (COMPARATIVE)

Unlike example 3, the final firing of the supports, thus coated, is carried out this time at a temperature of 1100° C. for 2 hours under pure nitrogen.

This example thus appears in accordance with the teaching of the application published under FR 2 587 026 A1 for the production of a membrane filter made of SiC.

EXAMPLE 8 (COMPARATIVE)

Unlike the preceding example, the final firing of the coated supports is carried out this time at a temperature of 1700° C. for 2 hours under argon according to the teaching of EP 2 559 470 A1 for the production of a membrane made of SiC.

EXAMPLE 9 (COMPARATIVE)

Unlike example 6, the separating layer is obtained from a slip, the inorganic composition of which is as follows: 20% by weight of grains of the powder of α-SiC, the median diameter $d_{50}$ of which is of the order of 0.6 micrometer, 53% by weight of the powder of metallic silicon grains, the median diameter $d_{50}$ of which is approximately 4 micrometers, 27% of amorphous carbon powder, the median diameter $D_{50}$ of which is approximately 1 micrometer.

The supports, dried as described above, are finally fired under argon at a temperature of 1470° C. for 4 h at ambient pressure.

The characteristics and the properties of the filters thus obtained are measured as follows:

For each example, a sample of membrane on its support is placed in a scanning electron microscope equipped with a focused ion probe (FIB or focused ion beam). Slices are made in the thickness of the membrane layer along parallel planes making possible the observation of different sectional planes in order to represent a cross section of the membrane layer. In order to obtain a very good resolution between the ceramic walls and the porosity of the membrane throughout its thickness, a photograph of at least one million pixels is taken using the electron microscope according to a mode using secondary electrons (SE mode). The magnification used is such that the width of the image is between ten and one hundred times the mean size of the particles of the membrane separating layer, approximately 50 times according to the examples. On the basis of these photographs, a segmentation is carried out using ImageJ software in order to differentiate the porosity of the grains, attention being paid to the depth of field. For each photograph, the surface proportion of porosity of the membrane layer is determined. The mean of the proportions of the photographs taken themselves along in different planes within the membrane is a value representative of the volume of porosity of this membrane.

The tortuosity of examples 3 to 6 was determined using the iMorph© software.

The results are given in table 1, as are the following properties for which the experimental protocols followed are described below:

a) A measurement of specific flow or flow rate (relative water flow rate) is carried out on the filters according to the following method:

At a temperature of 25° C., a fluid consisting of demineralized water charged with $5.10^{-3}$ mol/l of KCl feeds the filters to be evaluated under a transmembrane pressure of 0.5 bar and a circulation speed in the channels of 2 m/s. The permeate (water) is recovered at the periphery of the filter. The measurement of the characteristic flow rate of the filter is expressed in l/min per filtration surface area in $m^2$ after 20 hours of filtration. In the table, the flow rate results have been expressed by reference to the data recorded for comparative example 3. More specifically, a value of greater than 100% indicates an increased flow rate with respect to the reference (example 3) and thus an improvement in the filtration capacity.

b) The abrasion resistance is measured by subjecting a filter produced according to the preceding examples a slip comprising 2 g/liter of a SiC powder with a median diameter of 250 micrometers passing through the channels of the filter according to a speed of 2 m/second. The loss of permeability (standard to be supplied) is measured after 20 hours of testing. Example 3 is regarded as reference (100). A lower value than 100, for example of 80, means a relative loss of permeability, lower by 20% with respect to the reference, and thus a better abrasion resistance.

c) The test of resistance to intensive backwashing consists in subjecting the filter to 1000 pulses of water under a pressure of 3 bar/second every minute so that the liquid passes through the porous walls countercurrentwise. The increase in permeability which can result from degradation of the membrane is measured. Example 3 is taken as reference (100). A lower value than 100, for example of 80, means a relative loss of permeability, lower by 20% with respect to the reference (and thus a better resistance to the mechanical stresses brought about by backwashing).

d) Turbidity test:

The procedure is carried out according to the following method: Synthetic dirty water comprising clay, salt, oil and surfactants, according to contents equal to 100 ppm, 4000 ppm, 300 ppm and 2 ppm respectively, is used. The dirty water feeds, at a constant temperature of 25° C., the filters to be evaluated under a transmembrane pressure of 0.5 bar and a circulation speed in the channels of 3 m/s. The filtrate (purified water) is recovered at the periphery of the filter. In order to estimate the filtration performance of the filter, the turbidity of the filtrate is measured continuously by means of a turbidimeter of Beam-Turbidy Meter Series LAT N1 type supplied by Kobold Instrumentation, after filtration cycles. Example 3 is regarded as reference (100). A higher value after the test on the turbidity thus corresponds to a poorer quality of filtration of the liquid.

The characteristics and the properties of the filters and of the membrane separating layer (designated in the table below by membrane) obtained according to examples 1 to 9 are given in table 1 below:

TABLE 1

|  | Example 1 (comp.) | Example 2 (comp.) | Example 3 (comp.) | Example 4 (invention) | Example 5 (invention) | Example 6 (comp.) |
|---|---|---|---|---|---|---|
| Intermediate layer No. 1 ($d_{50}$ powders) | DPF-C (11 μm) FCP07 (2.5 μm) | DPF-C (11 μm) FCP07 (2.5 μm) | DPF-C (11 μm) FCP07 (2.5 μm) | DPF-C (11 μm) FCP07 (2.5 μm) | DPF-C (11 μm) 1500F (2 μm) SIC (0.18 μm) | DPF-C (11 μm) FCP07 (2.5 μm) |
| Intermediate layer No. 2 ($d_{50}$ powder) | no | no | no | SiC (0.6 μm) | no | no |
| Intermediate firing (1650° C./Ar) | no | no | no | yes | no | no |
| Separating layer ($d_{50}$ powder) | SiC (0.6 μm) | SiC (0.6 μm) | SiC (0.6 μm) | SiC (0.18 μm) | SiC (0.18 μm) | SiC (0.18 μm) |
| $T_{max}$ firing of the separating layer | 1600° C./Ar | 1600° C./Ar | 1550° C./Ar | 1550° C./Ar | 1550° C./Ar | 1550° C./Ar |
| Characteristics of the final membrane filter after firings | | | | | | |
| SiC content by weight of the membrane (%) | 99.3 | >99.0 | >99.0 | >99.0 | >99.0 | >99.0 |
| Cumulative mean thickness of the separating and intermediate layers (micrometers) | 86 | 83 | 85 | 95 | 52 | 51 |
| Intermediate layer after firing | | | | | | |
| Median pore diameter (nm) | 1500 | 1000 | 1000 | 2000 | 900 | 2000 |
| Pore volume (%) | 42 | 42 | 40 | 45 | 42 | 45 |
| Median grain size (micrometers) | 10 | 10 | 10 | 10 | 5 | 10 |
| Membrane separating layer after firing | | | | | | |
| Mean thickness (micrometers) | 45 | 35 | 35 | 7 | 7 | 2 |
| Median pore diameter (nm) | 250 | 413 | 249 | 236 | 242 | 550 |
| Pore volume (%) | 40 | 40 | 31 | 45 | 44 | 52 |
| Tortuosity index | no measured | no measured | 1.8 | 1.4 | 1.4 | 1.2 |
| Median grain size (nm or nanometers) | 605 | 620 | 600 | 185 | 188 | 223 |

TABLE 1-continued

Properties of the membrane filter

|  |  |  |  |  |  |  |
|---|---|---|---|---|---|---|
| Specific flow rate index | 95 | 150 | Ref. = 100 | 150 | 140 | 148 |
| Abrasion resistance index | 98 | 50 | Ref. = 100 | 36 | 35 | 34 |
| Resistance index after 1000 backwashings (pulse 3 bar/sec) | 87 | 45 | Ref. = 100 | 25 | 26 | 88 |
| Turbidity index | Similar to the reference | A little higher than the reference | Reference | Similar to the reference | Similar to the reference | Too high with respect to the reference |

|  | Example 7 (comp.) | Example 8 (comp.) | Example 9 (comp.) |
|---|---|---|---|
| Intermediate layer No. 1 ($d_{50}$ powders) | DPF-C (11 μm) FCP07 (2.5 μm) | DPF-C (11 μm) FCP07 (2.5 μm) | DPF-C (11 μm) FCP07 (2.5 μm) |
| Intermediate layer No. 2 ($d_{50}$ powder) | no | no | no |
| Intermediate firing (1650° C./Ar) | no | no | |
| Separating layer ($d_{50}$ powder) | SIC (0.6 μm) | SIC (0.6 μm) | SIC (0.6 p.m) Si (4 μm) C (1 μm) |
| $T_{max}$ firing of the separating layer | 1100° C./2 h/$N_2$ | 1700° C./2 h/Ar | 1470° C./4 h/Ar |

Characteristics of the final membrane filter after firings

|  | | | |
|---|---|---|---|
| SiC content by weight of the membrane (%) | >98.5 | >99.0 | >99.0 |
| Cumulative mean thickness of the separating and intermediate layers (micrometers) | 85 | 81 | 80 |

Intermediate layer after firing

|  | | | |
|---|---|---|---|
| Median pore diameter (nm) | 900 | 1650 | 1000 |
| Pore volume (nm) | 39 | 44 | 42 |
| Median grain size (micrometers) | 10 | 11 | 10 |

Membrane separating layer after firing

|  | | | |
|---|---|---|---|
| Mean thickness (micrometers) | 45 | 25 | 30 |
| Median pore diameter (%) | 200 | 800 | 220 |
| Pore volume (%) | 31 | 45 | 40 |
| Tortuosity index | 1.9 | 1.2 | >1.9 |
| Median grain size (nm or nanometers) | 600 | 620 | 350 |

Properties of the membrane filter

|  | | | |
|---|---|---|---|
| Specific flow rate index | 85 | 250 | 105 |
| Abrasion resistance index | 125 | 29 | 98 |
| Resistance index after 1000 backwashings (pulse 3 bar/sec) | 112 | 10 | 120 |
| Turbidity index | Similar to the reference | Too high with respect to the reference | Similar to the reference |

The results collated in table 1 which precede indicate that examples 4 and 5 according to the invention exhibit the best combined performance qualities in the various tests and measurements carried out. The membrane filters of these examples have in particular a much better resistance to backwashing while exhibiting a very high abrasion resistance and a very high specific flow rate without deterioration in their selectivity.

In the end, the results collated in the table indicate that the material used according to the invention to manufacture the membrane separating layer can only be obtained following certain processing conditions, not yet described in the prior art.

The invention claimed is:

1. A filter for the filtration of a fluid, comprising or constituted by a support element made from a porous ceramic material, at least a portion of a surface of said support element being covered with a membrane separating layer, wherein:
    said membrane separating layer is constituted of at least 95% by weight of silicon carbide (SiC) in α crystallographic form,
    a porosity of the membrane separating layer is between 10% and 70% by volume,
    a median pore diameter in the membrane separating layer is between 50 nanometers and 500 nanometers,
    a mean thickness of the membrane separating layer is between 1 micrometer and 30 micrometers,
    a tortuosity of the membrane separating layer is less than 1.7.

2. The filter as claimed in claim 1, wherein a median size of the grains constituting the membrane separating layer is less than 400 nm and greater than 80 nm.

3. The filter as claimed in claim 2, wherein the median size of the grains constituting the membrane separating layer is less than 300 nm.

4. The filter as claimed in claim 1, wherein the mean thickness of the separating layer is between 4 and 15 micrometers.

5. The filter as claimed in claim 1, wherein the median pore diameter in the separating layer is between 100 and 300 nm.

6. The filter as claimed in claim 1, additionally comprising one or more intermediate layers positioned between the material constituting the support element and the material constituting the membrane separating layer.

7. The filter as claimed in claim 1, wherein the intermediate layer or layers are essentially constituted of SiC.

8. The filter as claimed in claim 1, wherein at least one intermediate layer exhibits a median pore diameter at least two times greater than that of the membrane separating layer.

9. The filter as claimed in claim 1, wherein the intermediate layer or layers exhibit(s) a mean thickness of between 5 and 100 micrometers.

10. The filter as claimed in claim 1, wherein said support element is provided in the form of a plate, of a disk, of a tube or of a parallelepiped.

11. The filter as claimed in claim 1, wherein the porous support element comprises or is constituted by a material chosen from silicon carbide, SiC recrystallized SiC, silicon nitride, silicon oxynitride, silicon aluminum oxynitride, or a combination thereof.

12. The filter as claimed in claim 1, wherein an open porosity of the material constituting the support element is between 20% and 70%.

13. The filter as claimed in claim 1, wherein the tortuosity of the support element is greater than 1 and/or less than 2.

14. The filter as claimed in claim 1, wherein the fluid is a liquid.

15. The filter as claimed in claim 1, wherein the tortuosity of the membrane separating layer is less than 1.5.

16. The filter as claimed in claim 3, wherein the median size of the grains constituting the membrane separating layer is less than 250 nm.

17. A process for the manufacture of a filter as claimed in claim 1, comprising:
    preparing a slip starting from a powder of silicon carbide particles with a mean size of between 0.05 and 0.4 micrometers,
    applying said slip to a support element, under conditions making possible the formation of a layer of the slip on at least a part of an external surface of said support,
    drying then firing under a nonoxidizing atmosphere at a temperature of between 1400° C. and 1600° C., and in said temperature range for a time sufficient to obtain the membrane separating layer, said layer being constituted of at least 95% by weight of silicon carbide (SiC) in α crystallographic form.

18. The process for the manufacture of a filter as claimed in claim 17, additionally comprising, before applying said slip, depositing at least one intermediate layer starting from a slip comprising a powder of silicon carbide particles, at least a fraction of the grains of which exhibits a median diameter of less than 1 micrometer and greater than 0.1 micrometer.

19. A method comprising filtrating a liquid with a filter as claimed in claim 1.

* * * * *